(12) United States Patent
Ap et al.

(10) Patent No.: US 6,595,433 B2
(45) Date of Patent: Jul. 22, 2003

(54) DEVICE FOR COOLING A VEHICLE WITH AN ELECTRIC MOTOR POWERED BY A FUEL CELL

(75) Inventors: Ngy Srun Ap, Saint Remy les Chevreuses (FR); Philippe Jouanny, Guyancourt (FR)

(73) Assignee: Valeo Thermique Moteur, La Verriere (FR)

( * ) Notice: Subject to any disclaimer, the term of this patent is extended or adjusted under 35 U.S.C. 154(b) by 32 days.

(21) Appl. No.: 09/983,886

(22) Filed: Oct. 26, 2001

(65) Prior Publication Data

US 2002/0053216 A1 May 9, 2002

(30) Foreign Application Priority Data

Nov. 9, 2000 (FR) .............................................. 00 14417

(51) Int. Cl.[7] .................................................. B60H 1/02
(52) U.S. Cl. ............................... 237/12.3 B; 180/65.1; 165/41
(58) Field of Search ...................... 237/12.3 A, 12.3 B; 123/41.29, 41.31; 165/41, 42; 180/65.1

(56) References Cited

U.S. PATENT DOCUMENTS

| | | | | |
|---|---|---|---|---|
| 4,951,871 A | * | 8/1990 | Hata et al. | ................. 237/12.1 |
| 5,537,956 A | * | 7/1996 | Rennfeld et al. | ......... 123/41.29 |

FOREIGN PATENT DOCUMENTS

| | | |
|---|---|---|
| FR | 2 792 259 | 10/2000 |
| WO | WO 96/41393 | 12/1996 |

* cited by examiner

*Primary Examiner*—Harold Joyce
*Assistant Examiner*—Derek Boles
(74) *Attorney, Agent, or Firm*—Liniak, Berenato & White

(57) ABSTRACT

The device comprises a main loop (18) for cooling the fuel cell (12) and a secondary loop (20) for cooling at least the motor (10). These two loops (18, 20) form part of the same circuit which is traversed by a single refrigerant fluid and which comprises a section (22) common to the two loops on which a common pump (24) is mounted, and at least one regulation valve (38) is provided which is suitable for sharing the refrigerant fluid between the loops (18, 20) according to a chosen law. Application to electric and hybrid vehicles.

13 Claims, 2 Drawing Sheets

DEVICE FOR COOLING A VEHICLE WITH AN ELECTRIC MOTOR POWERED BY A FUEL CELL

FIELD OF THE INVENTION

The invention relates to the cooling of motor vehicles.

It relates more particularly to a device for cooling a vehicle with an electric motor powered by a fuel cell.

BACKGROUND OF THE INVENTION

Such a device can be applied to vehicles driven solely by an electric motor, as well as to vehicles of the hybrid type which are capable of being driven either by an electric motor or by a motor of another type, in particular by an internal-combustion engine.

In a motor vehicle of the abovementioned type, it is necessary to provide for the cooling of the fuel cell, given that the latter is generally fed with hydrogen and with air under pressure, which are usually at a temperature higher than the ambient temperature.

It is also necessary to provide for the cooling of the electric motor proper, as well as of its power control and of other accessories, as appropriate.

Cooling devices of this type are already known, which comprise a main loop with a main radiator for cooling the fuel cell and a secondary loop with a secondary radiator for cooling at least the electric motor.

In the known devices, the main loop and the secondary loop are formed as two separate circuits which are each traversed by a specific cooling fluid and which each comprise an electric pump, an expansion chamber and regulation means. The main reasons for the existence of two separate circuits relate principally to the fact that these two circuits have to operate at different levels of temperature and of throughput. In fact, the main circuit has to operate at a temperature and at a throughput which are higher than the secondary circuit.

Because of the existence of two separate loops or circuits, the cooling device includes a large number of components, which has the drawback especially of complicating the production of the device and of increasing its bulk.

SUMMARY OF THE INVENTION

The object of the invention is especially to overcome the abovementioned drawbacks.

It aims in particular to procure a cooling device of simplified structure comprising a reduced number of components.

To that end the invention proposes a cooling device of the type defined in the introduction, in which the main loop and the secondary loop form part of the same circuit which is traversed by a single cooling fluid and which comprises a section common to the two loops on which a common pump is mounted, and in which at least one regulation valve is provided which is suitable for sharing the refrigerant fluid between the two loops according to a chosen law.

Thus the cooling device of the invention groups together the main loop and the secondary loop within the same circuit which is traversed by a single refrigerant fluid, under the action of a common pump.

This makes it possible to reduce the number of components of the circuit, and, furthermore, to allow the main loop and the secondary loop to function with their own specific features, in particular as regards the level of throughput and of temperature, especially by virtue of a specific regulation valve.

In a first embodiment of the invention, the common section comprises only the pump, and the device further comprises a single regulation valve placed upstream of the pump.

Advantageously, this takes the form of a four-way valve which comprises a first inlet linked to the main loop downstream of the main radiator, a second inlet linked to a bypass from the main loop which goes round the main radiator, a third inlet linked to the secondary loop and an outlet linked to the common section.

In a second embodiment, the common section comprises the pump and the main radiator, and the device further comprises a first regulation valve placed downstream of the main radiator and upstream of the pump, as well as a second regulation valve placed downstream of the pump.

Advantageously, the first regulation valve is a three-way valve which comprises a first inlet linked to the main loop downstream of the main radiator, a second inlet linked to a bypass from the main loop which goes round the main radiator and an outlet linked to the common section. The second regulation valve is advantageously a three-way valve which comprises an inlet linked to the common section, a first outlet linked to the main loop upstream of the fuel cell and a second outlet linked to the secondary loop upstream of the secondary radiator, in such a way that the secondary loop is mounted in parallel with the fuel cell.

In a third embodiment of the invention, the main radiator is divided into a first part and a second part, the common section comprises the pump, the first part of the main radiator and the secondary radiator, while the second part of the main radiator forms part of the secondary loop. The device then further comprises a regulation valve placed upstream of the main radiator.

In this third embodiment of the invention, a four-way valve is advantageously used, which comprises a first inlet linked to the main loop downstream of the fuel cell, a second inlet linked to the secondary loop downstream of the second part of the main radiator, a first outlet linked to the common section upstream of the first part of the main radiator and a second outlet linked to a bypass from the main loop which goes round the first part of the main radiator.

In this third embodiment of the invention, the first part of the main radiator and the secondary radiator can be mounted either in series or in parallel.

Advantageously, whatever the chosen embodiment, the device further comprises an expansion chamber mounted in the main loop. It may further comprise at least one air heater mounted in the main loop in order to provide for the heating of the passenger compartment of the vehicle.

Advantageously, the device further comprises a motor-driven fan unit associated with the main radiator, or else with the secondary radiator.

BRIEF DESCRIPTION OF THE DRAWINGS

In the description which follows, given solely by way of example, reference is made to the attached drawings, in which.

DESCRIPTION OF THE PREFERRED EMBODIMENTS

Figure 1:
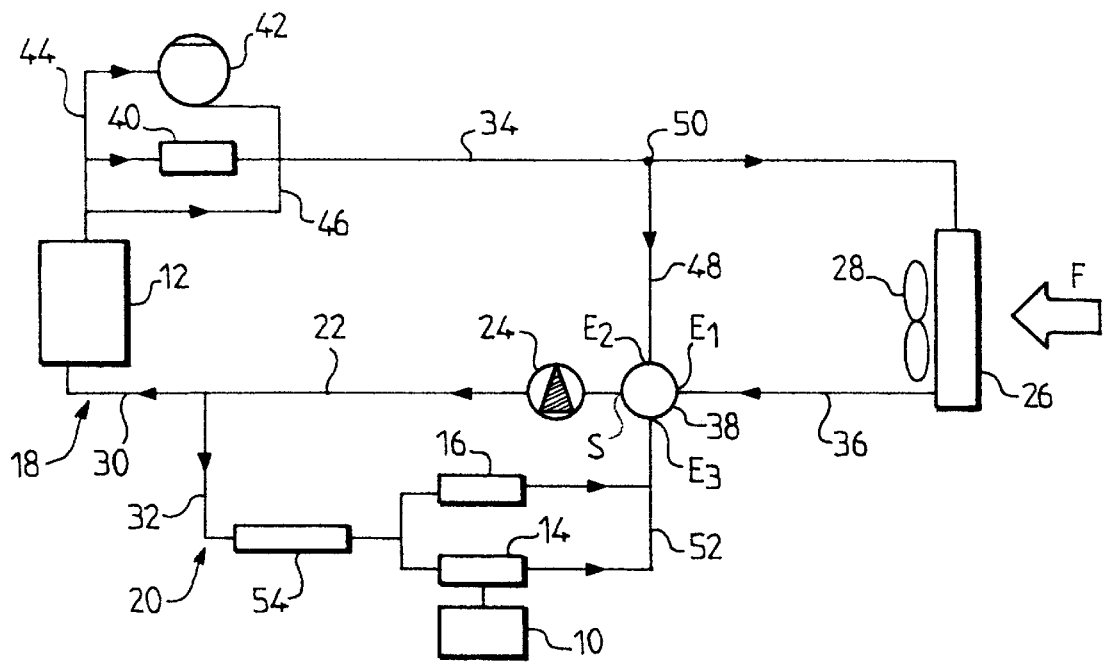
FIGS. 1 to 3 are diagrams representing three different embodiments of a device according to the invention.

FIG. 1 diagrammatically represents a cooling device for a motor vehicle driven by an electric motor 10 which is powered from a fuel cell 12. The device comprises a single circuit for cooling the fuel cell 12, which is fed with hydrogen and air having a temperature which is higher than the ambient temperature. The device also serves to cool various electrical appliances 14, including the power control for the motor, and various accessories 16.

The device comprises a main loop 18 and a secondary loop 20 which possess a common section 22 on which is mounted a common electric pump 24 able to cause the same fluid to circulate in the branches 18 and 20.

The main branch 18 comprises a main radiator 26 with which a motor-driven fan unit 28 is associated. The radiator 26 is capable of being cooled by an airflow F put into motion by the action of the motor-driven fan unit 28 and/or of the speed of the vehicle.

At the outlet from the common section 22, the circuit 22 divides into two ducts 30 and 32 belonging respectively to the main loop 18 and to the secondary loop 20.

The duct 30 leads to the fuel cell 12. Downstream of the fuel cell is placed a duct 34 which leads to the main radiator 26. The outlet of this radiator is linked by a duct 36 to a regulation valve 38, of the four-way type, which will be described later on.

On the duct 34 is mounted an air heater 40 suitable for being traversed by an airflow in order to provide for the heating of the passenger compartment of the vehicle. The main loop 18 comprises an expansion chamber 42 linked to the duct 34 by ducts 44 and 46.

The regulation valve 38 comprises three inlets E1, E2 and E3 and an outlet S. The inlet E1 is linked to the duct 36, that is to say to the main loop 18, downstream of the main radiator 26. The inlet E2 is linked to a bypass 48 which goes round the main radiator 26 and which is linked to an intermediate point 50 of the duct 34. The third inlet E3 is linked to a duct 52 of the secondary loop 20. The outlet S is linked to the common section 22, upstream of the electric pump 24.

A secondary radiator 54 is mounted on the duct 32 of the secondary loop 20. At the outlet from the radiator 54, the duct 32 divides into two ducts on which are mounted electrical appliances 14 and the accessories 16 respectively.

The regulation valve 38 makes it possible to regulate the throughput and the temperature of the cooling fluid separately, in the main loop 18 and in the secondary loop 20. The main loop 18 functions with a generally higher throughput (typically of the order of 5000 liters per hour) than the secondary loop which functions with a lower throughput (typically of the order of 2000 liters per hour).

Furthermore, the main loop 18 functions at a higher temperature, called high temperature (HT), while the secondary loop 20 functions at a lower temperature, called low temperature (LT).

By virtue of an appropriate design of the regulation valve 38, the loops 18 and 20 can retain their specific features as regards their levels of throughput and of temperature.

This valve can make the fluid pass either into the main radiator 26 or into the bypass 48. In this latter case, the cooling fluid does not pass through the main radiator, but only the air heater 40, which promotes the heating of the passenger compartment, especially during the winter period.

In contrast, when the fluid passes through the main radiator, the cooling fluid is cooled essentially by the main radiator 26.

It should be noted that, by virtue of a particular design of the regulation valve 38, it is possible to promote the passing of the cooling fluid either into the main loop, or into the secondary loop depending on the operating conditions.

Figure 2:
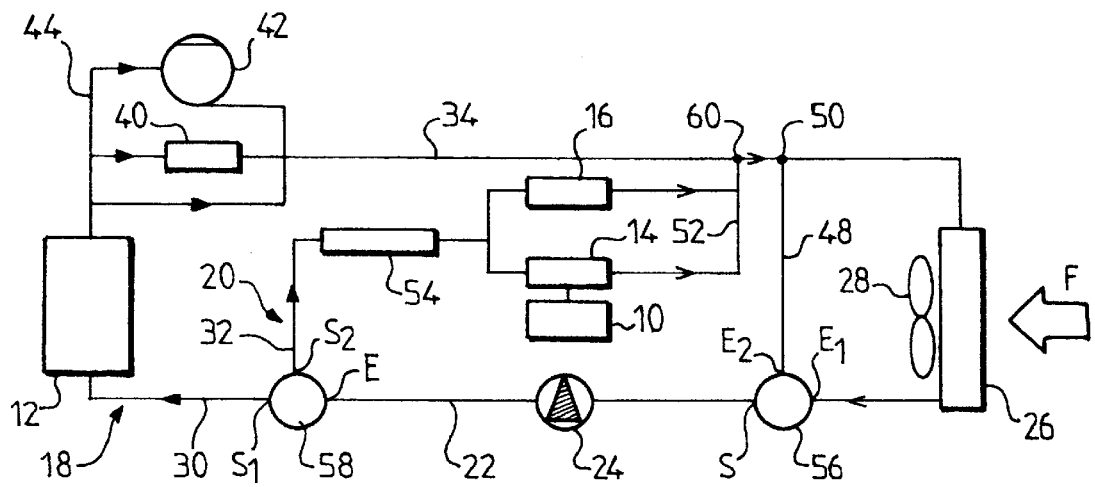

The embodiment of FIG. 2 is similar to that of FIG. 1, and the common elements are designated by the same numerical references.

In this embodiment, the common section 22 comprises both the pump 24 and the main radiator 26. Furthermore, the device comprises a first regulation valve of the three-way type placed downstream of the main radiator 26 and upstream of the pump 24, and a second regulation valve 58 of the three-way type placed downstream of the pump 24. The main loops 18 and 20 consequently divide at the outlet of the regulation valve 58.

The first valve 26 comprises two inlets E1 and E2 and an outlet S which are similar respectively to the first two inlets E1 and E2 and to the outlet S of the valve 38 of FIG. 1. The inlet E1 is linked to the main loop downstream of the main radiator 26, the inlet E2 is linked to the bypass 48 which goes round the main radiator, and the outlet S is linked to the common section, upstream of the electric pump 24.

The regulation valve 58 comprises an inlet E and two outlets S1 and S2. The inlet E is linked to the common section 22, the outlet S1 is linked to the main loop upstream of the fuel cell, and the outlet S2 is linked to the secondary loop upstream of the secondary radiator 54. The duct 52 of the secondary loop is linked here to the duct 34 of the main loop at a point 60 which is situated upstream of the point 50 of the junction with the bypass duct 48.

The regulation valve 56 makes it possible to make the fluid of the main loop pass either into the main radiator 26 or into the bypass duct 48.

The regulation valve 58 makes it possible to share the cooling fluid between the main loop 18 and the secondary loop 20 according to a chosen law.

Figure 3:
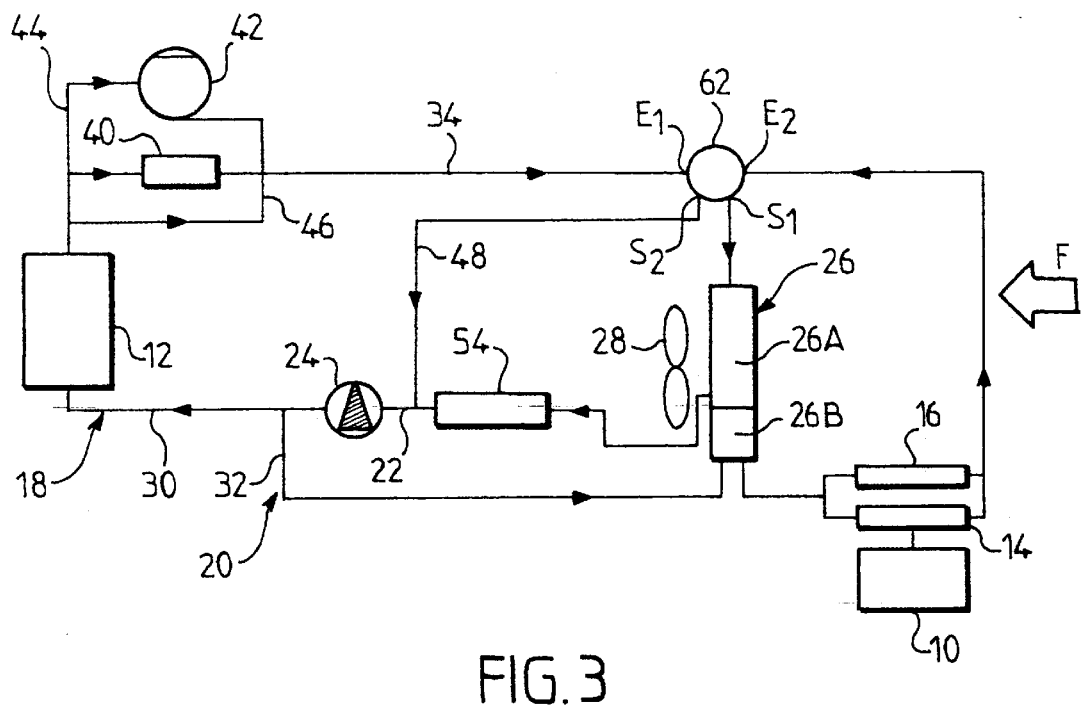

The device in accordance with FIG. 3 is similar to that of FIG. 1, and the common elements are designated by the same numerical references.

The main radiator 26 here is divided into a first part 26A and a second part 26B which form part respectively of the main loop and of the secondary loop.

The common section 22 comprises the electric pump 24, the first part 26A of the main radiator as well as the secondary radiator 54. The second part 26B of the main radiator forms part of the secondary loop. The device here comprises a single regulation valve 62 of the four-way type which comprises two inlets E1 and E2 and two outlets S1 and S2. The inlet E1 is linked to the main loop downstream of the fuel cell 12 and of the air heater 40. The inlet E2 is linked to the secondary loop downstream of the second part 26B of the main radiator and also downstream of the appliances 14 and accessories 16. The outlet S1 is linked to the common section 22 upstream of the first part 26A of the main radiator. The outlet S2 is linked to the bypass 48 which goes round the first part of the main radiator. This bypass 48 opens out into the common section 22 at a point 64 situated between the secondary radiator 54 and the electric pump 24.

In the embodiment of FIG. 3, the first part 26A of the main radiator and the secondary radiator 54 are mounted in series. The fluid originating from the outlet S1 of the regulation valve 62 passes successively through this first part 26A of the main radiator and the secondary radiator 54 before being drawn in by the pump 24.

It should be noted that the motor-driven fan unit 28 makes it possible to provide for the cooling of the fluid which passes through the two parts of the radiator.

At the outlet of the electric pump, the fluid is shared between the main loop which especially comprises the cell 12 and the air heater 40 and the secondary loop which contains the second part 26B of the main radiator as well as the appliances 14 and accessories 16.

The regulation valve 62 receives the cooling fluid originating respectively from the main loop and from the secondary loop, and then makes the fluid pass either into the first part of the main radiator 26A or into the bypass duct 48 depending on whether the fluid has or has not to be cooled by the main radiator.

Figure 4:
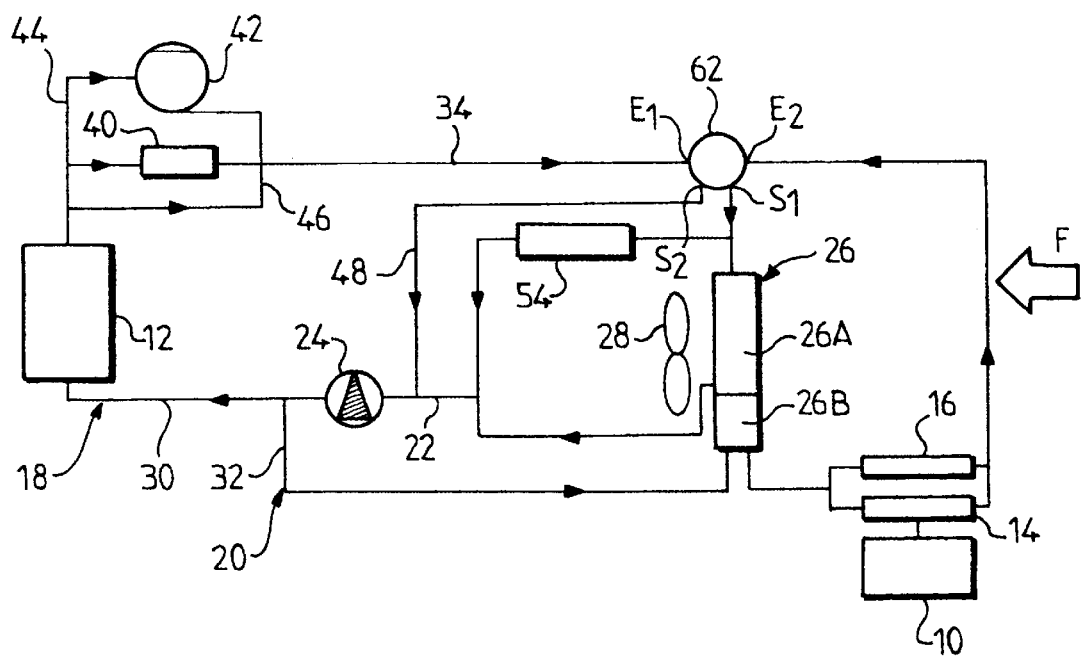
FIG. 4 is a diagram representing a variant embodiment of FIG. 3.

The embodiment of FIG. 4 is closely similar to that of FIG. 3, except that the first part 26A of the main radiator and the secondary radiator 54 are mounted in parallel, and not in series.

The cooling device of the invention thus offers the advantage of using a single cooling fluid, namely a fluid compatible with the fuel cell and the other heat exchangers or radiators. In particular, this may be a mixture of the water/ethylene glycol type.

Another advantage lies in the fact that the number of components is reduced since the electric pump is common to the two loops, as is the expansion chamber in particular.

The device of the invention is capable of numerous variant embodiments. Thus, in particular, the motor-driven fan unit 28 may be associated with the secondary radiator 54 in place of the main radiator 26.

The invention finds a particular application to motor vehicles of the electric or hybrid type.

What is claimed is:

1. Device for cooling a vehicle with an electric motor powered by a fuel cell, comprising a main loop with a main radiator for cooling the fuel cell and a secondary loop with a secondary radiator for cooling at least the motor, characterized in that the main loop (18) and the secondary loop (20) form part of the same circuit which is traversed by a single refrigerant fluid and which comprises a section (22) common to the two loops on which a common pump (24) is mounted, and in that at least one regulation valve (38; 56, 58; 62) is provided which is suitable for sharing the refrigerant fluid between the loops (18, 20) according to a chosen law.

2. Device according to claim 1, characterized in that the common section (22) comprises only the pump (24), and in that the device further comprises a single regulation valve (38) placed upstream of the pump (24).

3. Device according to claim 2, characterized in that the regulation valve (38) is a 4-way valve which comprises a first inlet (E1) linked to the main loop (18) downstream of the main radiator (26), a second inlet (E2) linked to a bypass (48) from the main loop which goes round the main radiator (26), a third inlet (E3) linked to the secondary loop (20), and an outlet (S) linked to the common section (22).

4. Device according to claim 1, characterized in that the common section (22) comprises the pump (24) and the main radiator (26), and in that the device further comprises a first regulation valve (56) placed downstream of the main radiator (26) and upstream of the pump (24), as well as a second regulation valve (58) placed downstream of the pump (24).

5. Device according to claim 4, characterized in that the first regulation valve (56) is a 3-way valve which comprises a first inlet (E1) linked to the main loop (18) downstream of the main radiator (26), a second inlet (E2) linked to a bypass (48) from the main loop which goes round the main radiator (26) and an outlet (S) linked to the common section (22), while the second regulation valve (58) is a 3-way valve which comprises an inlet (E) linked to the common section (22), a first outlet (S1) linked to the main loop (18) upstream of the fuel cell (12) and a second outlet (S2) linked to the secondary loop (20) upstream of the secondary radiator (54), in such a way that the secondary loop is mounted in parallel with the fuel cell.

6. Device according to claim 1, characterized in that the main radiator (26) is split into a first part (26A) and a second part (26B), in that the common section (22) comprises the pump (24), the first part (26A) of the main radiator and the secondary radiator (54), while the second part (26B) of the main radiator forms part of the secondary loop (20), and in that the device further comprises a regulation valve (62) placed upstream of the main radiator (26).

7. Device according to claim 6, characterized in that the regulation valve (62) is a 4-way valve, which comprises a first inlet (E1) linked to the main loop (20) downstream of the fuel cell (12), a second inlet (E2) linked to the secondary loop (20) downstream of the second part (26B) of the main radiator, a first outlet (S1) linked to the common section (22) upstream of the first part (26A) of the main radiator and a second outlet (S2) linked to a bypass (48) from the main loop which goes round the first part (26A) of the main radiator (26).

8. Device according to claim 6, characterized in that the first part (26A) of the main radiator and the secondary radiator (54) are mounted in series.

9. Device according to claim 6, characterized in that the first part (26A) of the main radiator and the secondary radiator (54) are mounted in parallel.

10. Device according to claim 1, characterized in that it further comprises an expansion chamber (42) mounted in the main loop (20).

11. Device according to claim 1, characterized in that it further comprises an air heater (40) mounted in the main loop (20).

12. Device according to claim 1, characterized in that it further comprises a motor-driven fan unit (28) associated with the main radiator (26).

13. Device according to claim 1, characterized in that it further comprises a motor-driven fan unit (28) associated with the secondary radiator (54).

* * * * *